United States Patent Office 2,818,026
Patented Dec. 31, 1957

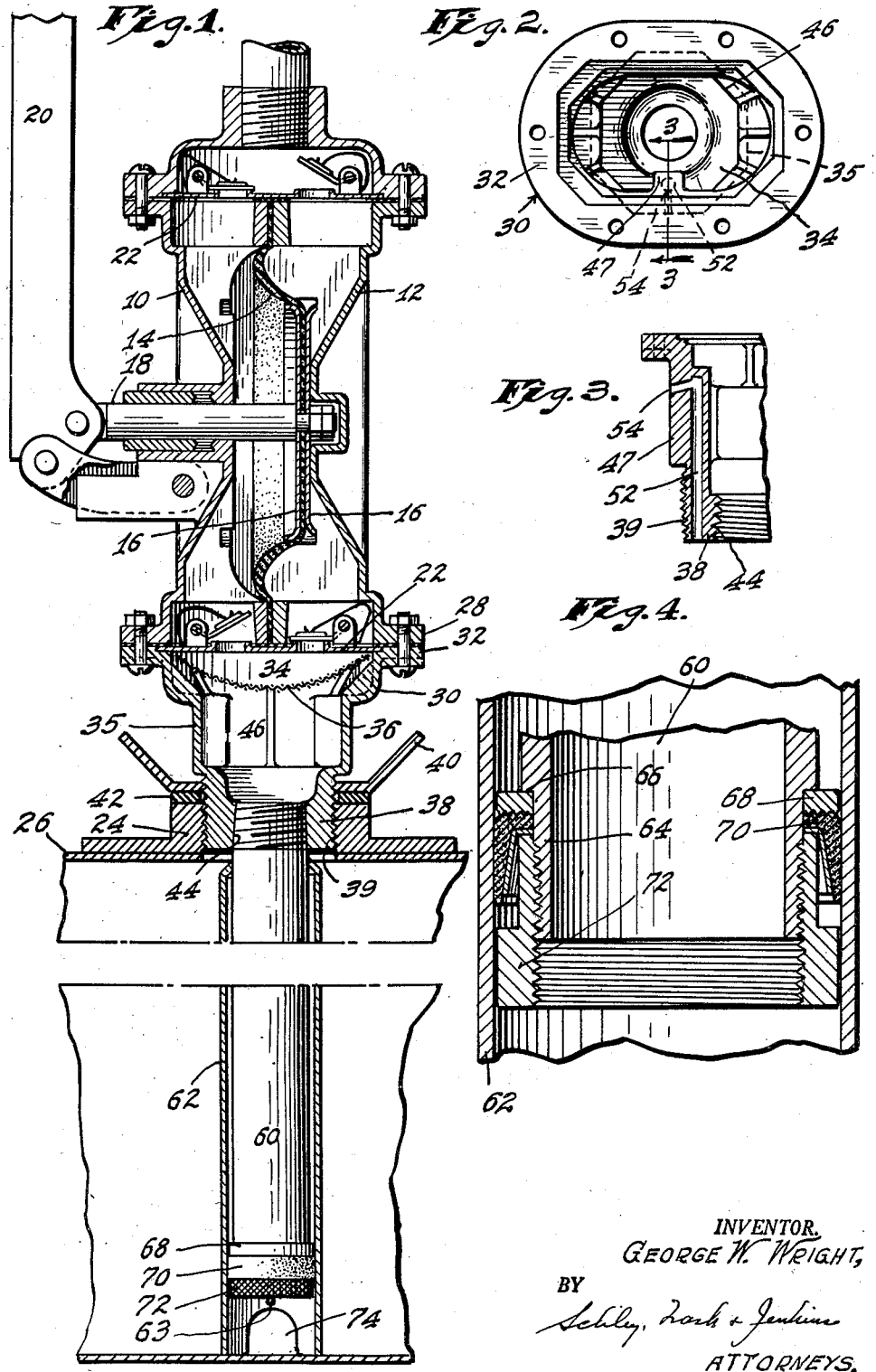

2,818,026

PUMP CONNECTOR MOUNTING

George W. Wright, Yoder, Ind., assignor to Tokheim Corporation, Fort Wayne, Ind., a corporation of Indiana Application November 29, 1954, Serial No. 471,549

2 Claims. (Cl. 103—150)

This invention relates to a connector mounting for a manually operable diaphragm pump, and especially a pump of the type shown in my prior Patent No. 2,685,304.

It is an object of the invention to provide a connector mounting and especially an inlet mounting for a pump in which operating forces act normal to the axis of the mounting, which mounting retains a valve plate in operative position with respect to the pump, which may serve as a screen housing, which is adapted for use in a wide variety of installations, and which in combination with a suction stub or tube is adapted to be received directly in the bung fitting of a tank to support both the pump and the suction stub and to provide inlet communication from the bottom of a tank to the pump and a vent for the top of the tank. It is a further object of the invention to interrelate the inlet fitting with the parts of an exensible suction stub so that the combination is adapted to be handled and installed as a unit and is adapted to fit a wide variety of tanks.

In accordance with the invention, the connector mounting is arranged to clamp a valve plate between itself and the pump body, and its pump-engaging end is elongated in the direction of pump actuation forces and to provide space for two valves, such as are provided by the valve plate structure of my copending application Serial No. 445,030, filed July 22, 1954. The elongated body is of sufficient depth to provide a chamber for an inlet screen below such plate when the plate is an inlet valve plate and to provide valve clearance when the plate is inverted to form an outlet valve plate. The lower end of the mounting is externally threaded with straight threads to fit a standard bunghole fitting, and the threads are provided with a wing nut which preferably acts against a relatively stiff sealing washer or gasket and which serves to lock the mounting rigidly to the bunghole fitting in any position which disposes the pump handle in a convenient direction for operation. The mounting is internally threaded, as with a tapered pipe thread, to receive the internal tube of the telescoping suction stub. Its internally threaded hole is smaller than the threaded exterior by an amount greater than the thickness of the outer tube of the suction stub to provide for the entrance of that outer tube through the opening which receives the threaded exterior of the mounting. The two telescoping tubes are readily slidable with respect to each other, and are sealed to each other by a piston packing, preferably disposed at the bottom of the internal tube. The outside tube is notched at its bottom end to provide an inlet opening from the tank to the suction stub when that outer tube rests on the bottom of a storage tank. A vent hole is formed in the wall of the mounting between its inner and outer threads, and communicates with the atmosphere at a point above the external threads.

The accompanying drawing illustrates the invention. In such drawing:

Fig. 1 is a vertical axial section of a pump supported on a connector mounting embodying the invention and arranged as an inlet mounting;

Fig. 2 is a plan view of the mounting fitting;

Fig. 3 is a fragmental vertical section of the fitting showing the vent hole; and Fig. 4 is an enlarged axial section of the inlet stub showing the sealing means at the lower end of its inner tube.

The pump shown in the drawing is of the type shown in my prior Patent No. 2,685,304, and comprises a front casing 10 and a rear casing 12 clamped together against the opposite faces of the rim of a diaphragm 14. The central portion of the diaphragm is clamped between a pair of disks 16 to form a central piston, which is reciprocated by a drive rod 18 driven by a manual handle lever 20, and the annular portion of the diaphragm between the rim and piston forms a working annulus which flexes as the piston is reciprocated. The pump is a double-acting pump, with displacement chambers formed on both sides of the diaphragm 14; and the inner walls of those chambers are formed to mate with the surfaces of the diaphragm at the ends of its stroke, to give the pump a small clearance volume and a high suction lift. The two casings 10 and 12 terminate at the top and bottom with flanged flat faces adapted to receive inlet and outlet fittings by which valve plates 22 are clamped against the assembled casing to provide the inlet and outlet valves for the pump.

The inlet fitting or mounting 30 carries a top flange 32 on which the pump body is secured by means of its lower flange 28. The upper section 34 of the mounting forms an elongated chamber of a depth to receive an inlet screen 36 which may be secured in place by clamping its edges between the flanges 32 and 28. The walls of the screen section 34 are integrally joined at the bottom to a straight-sided hollow section 35 whose outer surfaces are hexagonal in outline for convenient reception in a wrench. The side-walls of such wrench section, lying below and parallel with the long sides of the screen section 34, are thickened to strengthen the mounting in the direction of pump-operating forces; and the end walls of the screen section are internally ribbed for the same purpose.

The lower end of the wrench section 35 is integrally joined to a nipple section 38, whose outer surface carries straight external threads 39 of considerable length. The threaded section 38 carries a wing nut 40 and a gasket ring 42, such gasket ring preferably being of relatively rigid material and fitting the external threads 39 with sufficient tightness to retain itself and the wing nut 40 on the nipple 38 during shipment and handling. The nipple 38 is also provided with internal threads 44, which are desirably tapered pipe threads. The inner threaded hole of the nipple 38 is relatively smaller in diameter than the threaded exterior of the nipple 38, to leave a relatively thick wall between the inner and outer threaded surfaces of the nipple.

The thick side walls 46 of the wrench section 35 lie substantially directly above the thick wall of the nipple 38. One of such side walls 46 is internally thickened by a rib 47, and such ribbed wall and its underlying nipple wall portion is bored axially to provide a vent hole 52 leading to a point adjacent the top of the wrench section 35 and there communicating with a downwardly sloping cross hole 54 leading to the exterior of the mounting.

The inner threads 44 of the nipple 38 connect the mounting 30 to the inner pipe or tube 60 of the suction stub. An outer thin-walled tube 62 is telescopically received on the inner tube 60, and its upper end is bent inward into slidable guiding engagement with that tube 60. The lower end of the tube 60 is provided with a reduced-diameter portion 64 terminating at a shoulder 66. A piston ring 68 is received against that shoulder and forms a support for a cup-shaped packing 70, held in place by a collar 72 threaded onto the reduced-diameter end 64 of the inner tube 60. The lower end of the collar 72 is enlarged to slidably guide the outer tube 62.

The two tubes 60 and 62 may be of substantially the same length, and are prevented from reaching a fully telescoped relation by a cross-pin 63 spaced above the lower end of the outer tube 62. Such lower end is provided with one or more notches 74 to provide lateral inlet openings through which the suction stub may communicate with a tank with the outer tube 62 resting on the bottom of that tank.

The inlet assembly of this application provides a sturdy support for a diaphragm pump of the type shown, and is well able to withstand the alternating forces applied during the operation of the pump. Moreover, it provides a mounting which is adaptable to support the pump in a wide variety of installations. As shown in the drawings, the straight external threads of the nipple 38 are screwed directly into the bunghole fitting 24 of a tank 26. Within reasonable limits, the tank can be of any shape or size, and the pump may be mounted either on the side of the tank or on the end of a drum. In a small tank, as indicated in Fig. 1, the suction stub is substantially fully collapsed. In larger tanks it would be more fully extended to bring its lower end against or close to the bottom of the tank.

In preparing the pump assembly for insertion in a tank, the suction tube is desirably extended, by manually slipping the outer tube 62 outward on the inner tube 60, to a length greater than the depth of the tank. The extended tube is then inserted through the bunghole and the mounting threaded into the bunghole fitting. The insertion movement will collapse the stub to a length which locates its intake end on or near the bottom of the tank. With the pump turned to a convenient position for use, the lock nut 40 is screwed down tight, to clamp the gasket ring 42 against the bunghole fitting and to lock the mounting securely and rigidly to that fitting, so that no looseness or wobbling will occur when the pump handle is operated.

Normally, the tank will be closed, and the mounting 30 will close the insertion opening. The vent hole 52 in the mounting 30 will allow the tank to breathe, and will permit air to enter the tank to replace the liquid pumped from it.

Instead of mounting the pump directly on a tank, the same fitting may be used for a variety of other installations. For example, it may be supported by its external threads 39 on any convenient pipe stand, and connected by piping from its internal threads 44 to an underground tank, either directly or by extended and jointed piping. When the pump is mounted directly above an underground tank, the suction stub 60—62 can be placed in the tank and connected to the mounting by a suitable pipe extension.

I claim as my invention:

1. A mounting connector for a diaphragm pump having a lever-operated, horizontally reciprocable pump rod and a casing assembly lying generally normal to the direction of rod reciprocation and having a valve-plate receiving bottom flange, said mounting connector comprising a flanged upper section adapted to support the casing flange and clamp a valve plate thereagainst, a downward extending wrench section integral with said upper section and having a wrench-receiving polygonal outer surface, and a downward extending nipple section integral with the wrench section, said nipple section having external straight mounting threads and an internally threaded opening to receive a fluid-conveying pipe, said upper section being elongated in the direction of rod reciprocation and having side walls overlying and merging with opposite flat sides of the polygonal section and said flat sides being thickened and overlying and merging with the wall of the nipple section, and a drill bore extending upward through the nipple section wall and an overlying thickened wrench section wall and connecting at its upper end with a lateral vent bore closely below the flange of said flanged upper section.

2. In a diaphragm pumping apparatus having a horizontally reciprocable pump rod, a diaphragm lying generally normal to the direction of reciprocation, a pair of casings clamping the periphery of the diaphragm between them and forming pumping chambers on opposite sides thereof, said casings respectively having bottom end faces which together form a flanged base lying generally tangential with respect to the diaphragm for supporting the casing assembly and having inlet passages therethrough respectively communicating with the two pumping chambers, and a lever operating between the casing structure and the pump rod in a central plane normal to said base and tending in its operation to rock the casing assembly on its support, the combination therewith of a mounting connector having a flanged upper section supporting said flanged base and clamped thereto and retaining valve means in operative relation with said inlet passages, and an integral downward-extending nipple section having straight external threads to engage an internally threaded tank fitting in rotatable mounting relation providing rotatable adjustment to position the said lever in a selected operating plane, and a lock nut carried by said external threads and movable against the tank fitting to lock said pump in adjusted position and against rocking movement with respect to the tank fitting, said nipple section also having an internal opening to receive a fluid-conveying pipe.

References Cited in the file of this patent

UNITED STATES PATENTS

| 384,633 | Lourie | June 19, 1888 |
| 386,418 | Wherry et al. | July 17, 1888 |
| 677,474 | Russell | July 2, 1901 |
| 903,084 | Hartley | Nov. 3, 1908 |
| 951,625 | Wilbur | Mar. 8, 1910 |
| 990,397 | Sheets | Apr. 25, 1911 |
| 1,595,027 | Sielaff | Aug. 3, 1926 |
| 1,977,360 | Talbot | Oct. 16, 1934 |
| 2,405,322 | Nisbet | July 10, 1945 |
| 2,496,688 | Armstrong | Feb. 7, 1950 |
| 2,623,469 | Gray | Dec. 30, 1952 |